UNITED STATES PATENT OFFICE.

WILLIAM N. BLAKEMAN, JR., OF MOUNT VERNON, NEW YORK.

PAINT COMPOSITION.

1,375,355.  Specification of Letters Patent.  Patented Apr. 19, 1921.

No Drawing.  Application filed June 12, 1917. Serial No. 174,258.

*To all whom it may concern:*

Be it known that I, WILLIAM N. BLAKEMAN, Jr., a citizen of the United States, and resident of the city of Mount Vernon, in the county of Westchester and State of New York, have invented a new and useful Paint Composition, which invention is fully set forth in the following specification.

The object of this invention is to impart drying properties to all semi-drying and non-drying animal, vegetable, and marine animal oils (including in the latter class those of both ichthyous and cetaceous origin) without splitting or cracking their constituent molecules or otherwise disturbing the glycerids, by any artificial or initial accelerating chemical reactions; and to utilize such oils as now found on the market in their raw or refined commercial condition, as vehicles, in the formation of paint-compounds.

By means of my invention all of the semi-drying and non-drying oils, either singly or combined, are made to dry satisfactorily, and those which fall within the economical scope of my invention are, of the marine animal oils, fish, menhaden, seal, whale, porpoise, shark, and the like; and, of the vegetable oils, cotton seed, soja bean, sunflower seed, corn, and the like.

The marine animal oils are all now regarded as semi-drying oils, but they only thicken with greater facility than the vegetable non-drying oils without showing a repellent surface. I have discovered, however, that the drying oil known as tung-oil exerts a remarkable action upon these marine animal oils, so that, when mixed therewith, a very satisfactory drying composition will be produced, and, when thus mixed, they may be built up into more economical mixtures by the addition, in various proportions, of the vegetable non-drying fatty oils, the ultimate mixtures showing the same satisfactory drying characteristics, which are specially marked when the oil is ground with anhydrous pigments or anhydrous comminuted matter.

If, for example, menhaden oil, carrying 15 per cent. of tung oil, properly blended, be spread on a plain surface, it will firm or dry in from 6 to 8 hours, and in a little less time if the usual proportion of turpentine Japan drier be added; and when 80 parts of this vehicle is ground with 100 parts of an anhydrous pigment, such as zinc-lead, the composition will firm or dry in from 2 to 3 hours, depending upon climatic conditions, and subsequently indurate into a permanent film, repellent to the elements. With the same proportions for whale oil and seal oil, as vehicles, similar reactions will be obtained, but the firming and indurating will consume a little more time.

The term zinc lead, as used herein, is intended to designate a class of pigments which have been on the market for many years and are now well-known in the trade by that name. They are all composed of zinc oxid and lead sulfate in varying proportions, the one which I prefer, consisting approximately, of 60 per cent. zinc oxid and 40 per cent. lead sulfate.

By retaining this proportion (15 per cent.) of tung oil, as a constant, and decreasing the associated proportions of menhaden or other marine animal oil between 15 per cent. and 25 per cent., compositions can be made with all of the non-drying fatty oils, imparting to them drying characteristics, in a very marked degree. Thus, for example, if 15 per cent. of menhaden, or whale oil, and 15 per cent. of tung oil, be mixed with soja bean oil, and 80 parts of this vehicle ground with 100 parts of an anhydrous pigment, such as zinc-lead, and the usual quantity of commercial liquid drier, this composition will firm or dry in from 3 to 3½ hours. Increasing the percentage of marine animal oil to 20 or 25 per cent. will reduce the time of firming to about 2 hours, according to climatic conditions; the resulting film, in either case, exhibiting very fine repellent surface.

From an economical standpoint, cotton seed oil is the most important of the non-drying vegetable fatty oils, and this oil, when mixed with marine animal oil and tung-oil, responds with great facility to the drying reaction, especially when ground with anhydrous pigments. Thus, if 15 per cent. of tung-oil and 20 to 25 per cent. of menhaden oil, be mixed with cotton seed oil, 80 parts of this vehicle when ground with an anhydrous pigment, such as 150 parts barytes (natural) and 30 parts of zinc lead, and the usual turpentine drier, will firm or dry in 2½ hours, and indurate into a permanent and repellent film. Instead of menhaden oil, seal or whale oil may be used, or a mixture of any of the marine animal oils, retaining the same percentage of tung-oil as a constant.

If desired, the oils used may be strengthened, or reinforced, by adding thereto a small percentage of their precipitates, derivatives or fractions, such as the stearins, precipitates and residuals of the various fatty oils; the precipitates, residuals, and semi-solid fractions of the hydro-carbons, such as naphthalene, paraffin wax, and still-ends; or the animal or vegetable waxes may be added. These substances, if added to the oil-vehicle, in the proportion of from one half of one per cent. to two per cent. will be found to act as repellent agents and render the paint-film more repellent to the elements and abrasive influences.

The remarkable behavior of tung oil in the presence of the marine animal oils, which I have discovered, is not exhibited or even approached by any other oil. Even linseed oil, which stands at the head of its class as a drying oil, fails to exert any such important action when thus compounded, notwithstanding that investigation has shown that linseed oil, in a given time, absorbs much more oxygen than tung oil.

A hydrogenated oil may be added to the vehicle if desired, and, used in small proportions, will be found to increase the repellent effect. An oil which has been hydrogenated to a thickened condition only, or of about the consistency of chilled honey or heavy sugar syrup, will give the best results. Thus 80 parts of cotton seed oil, carrying 15 per cent. tung oil, 20 per cent. menhaden oil, and either 10 per cent. of hydrogenated cotton seed oil or 5 per cent. of hydrogenated menhaden oil, when ground with an anhydrous pigment, such as 150 parts barytes (natural) and 30 parts zinc lead, and the usual quantity of liquid drier, will firm or dry in from 1½ to 3½ hours and indurate to a very beautiful repellent surface.

Any of the commercial liquid driers may be used in the usual proportions, provided they are free from unoxidizable matter. All the oil factors in the compound oil-vehicle must, for the best effects, be water free.

The vehicle herein described is claimed in another application filed by me herewith and bearing the Serial Number 174257.

Having thus fully described my invention, I claim:

1. A paint-composition comprising marine animal oil and tung oil, in their untreated commercial condition; and an anhydrous pigment.

2. A paint-composition comprising marine animal oil, tung oil, and a vegetable non-drying fatty oil, in their untreated commercial condition; and an anhydrous pigment.

3. A paint-composition comprising menhaden oil and tung oil in their untreated commercial condition, and an anhydrous pigment.

4. A paint-composition comprising menhaden oil, tung oil, and vegetable non-drying fatty oil, in their untreated commercial condition; and an anhydrous pigment.

5. A paint-composition comprising marine animal oil, tung oil, and cotton seed oil, in their untreated commercial condition; and an anhydrous pigment.

6. A paint-composition comprising menhaden oil, tung oil, and cotton seed oil, in their untreated commercial condition; and an anhydrous pigment.

7. A paint-composition comprising marine animal oil and tung oil, in their untreated commercial condition; a repellent agent; and an anhydrous pigment.

8. A paint-composition comprising marine animal oil, tung oil, and vegetable non-drying fatty oil, in their untreated commercial condition; a repellent agent; and an anhydrous pigment.

WM. N. BLAKEMAN, Jr.